2,787,528

PROCESS FOR PURIFYING GRAPHITE

Adrian C. Dorenfeld, Tuscaloosa, Ala., assignor to Southwestern Graphite Company, Burnet County, Tex., a corporation of Nevada No Drawing. Application September 18, 1953,
Serial No. 381,106

8 Claims. (Cl. 23—209.9)

This invention relates to processes for purifying graphite, and more particularly to a method for producing graphite with less than 3% ash.

For certain uses, it is necessary that graphite be of extremely high purity, with only 3% ash or less. For other uses, it is necessary that the graphite have 0.8% ash or less. Heretofore, the final step in graphite purification has frequently been one variety or another of various fluorine processes, wherein soluble fluorides are produced. Sometimes subsequent treatment includes treatment of the soluble fluorides with acids or acid salts to make them more soluble and easier to wash away. These processes demand use of substantial quantities of expensive chemicals, and necessitate the use of highly dangerous and corrosive fluorine compounds.

Another common process has been the fusion of impurities with sodium or other alkali compounds to form water soluble alkali silicates. The fusion is carried out either at elevated temperatures (700° C. for example) in the absence of water, or in very concentrated alkali solutions (30% or more NaOH) at atmospheric pressure boiling temperature. Sometimes the fusion is carried out under pressure at higher temperatures. This process suffers from the requirement of excessive use of chemicals which makes the processes uneconomical, and from the difficulty of washing the caustic solution free from the graphite. Various acids have been used to react with the excess caustic or alkali compounds and so aid in washing the alkali from the graphite, but this step adds additional costs to the process.

An object of this invention, therefore, is to provide a process for relatively inexpensive production of graphite of high purity.

Another object of this invention is to provide a process not necessarily involving the use of fluorine or fluorine compounds which produces a graphite with less than 3% ash from substantially less pure graphite.

Still another object of this invention is to provide a process for the purification of graphite wherein many of the impurities of the graphite may be easily recovered.

A further object of this invention is to produce a graphite which resists oxidation.

Other objects will appear from the following description.

These objects are accomplished, in accordance with this invention, by a process wherein the impure graphite is first treated with a solution of dilute sulphuric acid, and is thereafter treated with a mild caustic. In those instances where the impure graphite being treated contains a substantial amount of free silica, a mild fluorine wash step may be added, but it must be added only after the caustic treatment.

The principal impurities in most high carbon natural graphite are micas. The most common are biotite, $(H,K)_2(Mg,Fe)_2Al(SiO_4)_3$, and phlogopite, $$H_2KMg_3Al(SiO_4)_3$$

Flotation methods of and means for converting raw mined graphite into a graphite concentrate containing relatively little ash, are well known to the art. It is difficult, and in many instances impossible, to produce graphite with less than 3% ash by such means from most typical graphite ores. It is impossible to economically produce graphite with less than 0.8% ash by such means. This invention contemplates the conversion of graphite with impurities on the order of about 6 or 8%, whether it be raw mine graphite or graphite concentrate produced from flotation or other preliminary graphite, into graphite of very high purity. The process works on low grade graphite, but with less efficiency. It also works on higher grade graphite. In short, any graphite with mica and or metallic impurities is purified and enhanced in value as a result of being treated by this process.

When a relatively high quality raw graphite or graphite concentrate, i. e., a relatively high quality graphite feed is treated by this process, graphite with less than 0.8% ash, such as quality pencil and electric motor and generator brush manufacturers require, may be produced.

This invention involves four primary factors, acid, caustic, heat, and time. In some cases a mild fluorine wash is added. The order of use of acid, caustic, and in appropriate cases, fluorine, is critical, and is contrary to the teaching of the prior art, wherein either fluorine or caustic has always been thought to be the first step.

First a hot slurry of the impure graphite feed and acid is produced. The slurry may be mixed before heating; the acid solution may be heated before mixing; the graphite feed may be heated before mixing; or both the acid solution and the graphite feed may be heated before mixing.

Consider first the requirements of the acid. The solution must be one that does not contain an excess of oxidizing materials. For example, it has been found that when as little as 1% of the acid is nitric acid, the process does not work. The cost and difficulties of handling hydrochloric acid make it unacceptable. Sulphuric acid, however, is relatively inexpensive and easy to handle, and it does not place oxidizing materials in the solution which render inoperable the graphite purifying process.

A wide range of sulphuric acid concentrations will work with varying degrees of efficiency. Dilute sulphuric acid of 60% to 75% concentration is preferable. Depending upon various factors, acid concentrations anywhere from about 25% to 96% can be used and at least some purification of the graphite can still be obtained.

In the preferable process, however, 60 to 75% sulphuric acid is mixed with the impure graphite.

In the preferable process about 3.84 tons of 70% sulphuric acid is mixed with each ton of impure graphite to form a slurry which is then heated. The amount of acid is not critical. All that is necessary is that enough acid be used to react with the impurities. With fairly high grade impure graphite, the above indicated proportion provides a substantial excess of acid, but the proportion is preferred because it effects an easily handled slurry.

The factor of temperature is again subject to substantial variation, the process working more efficiently and rapidly at optimum temperatures, and working less efficiently at other temperatures. With the optimum slurry just described, a temperature of 150° C. is preferred, although substantial purification of the graphite may be obtained with temperatures ranging as low as 95° C. Conveniently, the slurry may be boiled at atmospheric or higher pressure.

The time during which the slurry is held at the predetermined temperature is subject to variation. When the graphite particles are small, a larger area per unit weight is exposed to the acid, and the time required is short. When the graphite particles are large, a smaller area per unit weight is exposed to the acid, and the time required is long.

The time may also vary in accordance with the purity of the graphite concentrate and the purity of product desired. If the feed has only 4% foreign matter and the desired product may have as much as 3%, then the time required is of course shorter than when the concentrate is less pure, or when a product with less than 0.8% impurity is required.

Further, the time may vary with the temperature at which the slurry is kept, the reaction requiring a longer time at low temperature than at high temperatures.

A typical graphite feed for chemical purification may have about 6% impurity, and may have particle sizes as follows:

| | Percent |
|---|---|
| +48 mesh | 0.56 |
| −48+65 mesh | 4.13 |
| −65+100 mesh | 22.10 |
| −100+150 mesh | 22.10 |
| −150+200 mesh | 13.80 |
| −200 mesh | Balance |

With particles of the impure graphite feed of such size, the acid at about 70% concentration, and the temperature at about 150° C., 30 minutes has been found to be an adequate time for holding the slurry heated.

This step converts the mica and metallic mineral impurities in the impure graphite into sulphates which are soluble in warm or hot sulphuric acid, and to insoluble silicic acid, probably having the formula $H_2SiO_3$.

It is not necessary that the slurry be cooled at this point. For practical reasons, however, in order to use less expensive materials for containing and filtering the slurry, it is preferably cooled prior to subsequent treatment. This may be accomplished by conventional heat exchanger equipment or by adding additional cold dilute acid of similar composition to that used for the initial treatment of the graphite.

The graphite is then separated from the fluids. A centrifugal separator or other means may be used, but filtration with filter cloth is preferred. Dynel, glass and Orlon filter cloths have been found to be satisfactory. The filtering step may be accelerated by the use of a vacuum to draw the filtrate through the filter, or by the use of pressure in a conventional pressure filter designed to handle hot acid slurries.

The cake is then washed thoroughly. Conveniently, the counter-current washing may be used either in batch or continuous operations. For example, the first wash may be with water that has been used as wash water three times previously; the second wash may be with water which has been used twice before; and the third wash may have been used once before. Additional washes with clean water are recommended; four or more such washes being preferred. The first wash may then be combined with the original filtrate and used to treat new impure graphite.

The number of washes, either used washes or clean water washes, may be varied. It has been found preferable to continue the washing until substantially all iron has been removed. The presence of iron may be indicated by red precipitate appearing when excess NaOH is added to a filtrate sample.

When the washing has been completed, the graphite cake is again heated, this time in a weak caustic solution. The caustic may be in only stoichiometric proportions for reaction with the insoluble silicic acid. Caustics which produce soluble silicates may be used. Among the possible caustics are ammonia, potassium, sodium or ammonium carbonate, potassium, sodium or ammonium bicarbonate, potassium, sodium or ammonium hydroxide. Calcium compounds are not acceptable, however, due to the insolubility of calcium silicate. Sodium hydroxide has been preferred in the early uses of the process.

It is preferable that the caustic step be carried out at boiling temperatures if under atmospheric pressure for at least 5 minutes. Higher temperatures may be used if the slurry is heated under pressure. Temperatures ranging on down to room temperature may also be used, but with ever decreasing purification of the graphite. For example in one test wherein the original impure graphite contained 5.5% ash, and wherein the acid step left 3.0% of insoluble impurities, substantially all of which was silicic acid, a caustic treatment at room temperature only reduced the insoluble impurities to 2.4%.

The slurry is then filtered and washed. It is preferred for the slurry to be filtered hot and washed once with hot water. Thereafter, there may be several washings with cold water, four cold water washings having been found adequate in most instances.

With certain typical row graphites or graphite concentrates, the foregoing procedure produces a graphite with less than 0.8% ash. When this ash is principally silica, or when the impure graphite feed contained a lot of free silica so that the graphite resulting from the above treatment is still not sufficiently pure for its intended uses, then a weak fluorine wash at this point may be used to extract that silica or quartz which was not soluble in the weak alkali solution. 60% hydrogen fluoride, ammonium fluoride, ammonium bifluoride, sodium fluoride, potassium fluoride, or other soluble fluoride salt yielding fluoride ions in acid solution, may be mixed with an acid such as sulphuric acid, for example, in stoichiometric proportions, added to the graphite produced by the previously described procedure, and agitated. Twenty-four hours of agitation produces most favorable results, but as little as one hour often suffices when the amount of quartz to be removed is small. Five clean water washes are usually sufficient at the conclusion of the fluorine step.

The cake is then dried. A graphite with less than 3% ash is produced, and if optimum acid concentration, temperatures, particle size, graphite concentrate and times are used, less than 0.8% ash may be expected from most graphite feeds, even without the fluorine step.

The process may be repeated any number of times with the same acid, with such additions as may be required. Preferably, after about 4 uses of the acid, salts should be removed by allowing it to cool and filtering. Coarse salts such as $Fe_2(SO_4)_3$, $Al_2(SO_4)_3$, $K_2SO_4$, and $MgSO_4$ derived from the graphite concentrate settle out, and are readily separated by filtration.

It should be noted that the acid used in this process may be used repeatedly, and that only small quantities of caustic are required even though none of it is reclaimed.

The filtrate from the caustic leach contains sodium silicate when a sodium caustic is used. This sodium silicate is readily obtained by evaporating the filtrate. Commercially, waste heat from the process may be used. Approximately 360 weight units of hydrated sodium silicate has been produced from 2900 weight units of a typical graphite concentrate. At present market prices, this may be sold for a sum sufficient to buy most of the chemicals needed for the treatment of the graphite, thus reducing the net cost of required chemicals.

The acid left with the salts precipitated therefrom may be recovered by distillation by use of waste heat. If this is done, up to ⅔ of the acid lost may be recovered.

Further, depending upon the graphite concentrate, the salts recovered from the acid may be of potential value. For example, salts of iron, aluminum, and minor amounts of potassium, vanadium or molybdenum usually found in graphite deposits may be obtained.

It is important to note that in this process, sulphuric acid not actually consumed by reaction with impurities is recovered and used again. Only small amounts of caustic are used since the caustic is used after the acid, and reacts only with the silicic acid that remains. For most purposes and on most graphite feeds, no fluorine step is needed at all. When it is used, only small amounts of fluorine are required because all impurities other than silica or quartz insoluble in weak caustic solution, have already been removed by processes much less expensive and less dangerous than the fluorine processes.

It is also important to note that graphite produced by this process, without the fluorine step, has a greater resistance to oxidation than other graphites. For example, a typical sample of graphite was found to be 54.5% oxidized after being held at 700° C. for 30 minutes, while a portion of the same graphite sample, after treatment was found to oxidize only 50.2% after being held at the same temperature for the same length of time. At 850° C. the untreated graphite was 52.5% oxidized while the treated graphite was only 45% oxidized after 30 minutes.

The foregoing description is to be construed as illustrative only, and is not to be construed in any limiting sense.

I claim:

1. The process of purifying graphite comprising preparing and heating a first slurry of impure graphite and sulphuric acid of a concentration between 25% and 96%, holding said slurry at a temperature above 95 degrees centigrade for a predetermined time, separating the fluids in said slurry from the graphite, preparing and heating a second slurry of previously acid treated graphite in a weak caustic solution, the caustic being one whose silicate is soluble in water, holding said second slurry above 50° C. for at least five minutes, and finally, separating the graphite from the fluids.

2. The process defined in claim 1 characterized by the additional steps of treating the previously acid and caustic treated graphite in a solution containing free fluoride ions, and separating the graphite from the fluids in the solution.

3. The process of purifying graphite comprising preparing and heating a first slurry of impure graphite and sulphuric acid of a concentration between 60% and 75%, holding said slurry above 135 degrees centigrade for at least 15 minutes, separating the graphite from the solution, washing the graphite, making a second slurry of previously acid treated graphite and a weak caustic solution, the caustic being chosen from the group consisting of ammonia, ammonium carbonate, ammonium bicarbonate, sodium carbonate, sodium bicarbonate, sodium hydroxide, potassium carbonate, potassium bicarbonate and potassium hydroxide, holding said second solution at about its boiling temperature for at least 5 minutes, separating the graphite from the solution, and washing the graphite.

4. The process defined in claim 3 characterized by the additional step of treating the previously acid and caustic treated graphite in a solution containing sulphuric acid and a fluoride salt yielding fluoride ions in such acid solution, then separating the graphite from the solution, and finally washing the graphite.

5. The process of purifying graphite containing mica and metallic mineral impurities comprising first, preparing a slurry of impure graphite and sulpuhric acid of a concentration between 60 and 75%, second, heating said slurry to a temperature in excess of 145° C. for at least 20 minutes to convert the impurities into soluble salts and insoluble silicic acid, third, separating the graphite and silicic acid from said solution and washing the graphite, fourth, preparing a slurry of previously acid treated graphite in a weak caustic solution, the caustic being chosen from the group consisting of sodium hydroxide, sodium carbonate, sodium bicarbonate, ammonia, ammonium carbonate, ammonium bicarbonate, potassium carbonate, potassium bicarbonate and potassium hydroxide, where there is sufficient caustic to react and form soluble silicates with at least a portion of the silicic acid in the previously acid treated graphite, fifth, boiling said caustic-containing slurry for at least 10 minutes, sixth, separating the graphite from the solution and washing the graphite.

6. The process defined in claim 5 characterized by the additional steps of treating the previously acid and caustic treated graphite with a solution containing fluoride ions for at least one hour, separating the graphite from the solution and finally washing the graphite.

7. The process defined in claim 5 characterized by the additional steps of obtaining a silicate of the group consisting of sodium silicate, potassium silicate and ammonium silicate from the filtrate of the caustic solution by evaporating away the liquid from that filtrate, and obtaining salts from the acid by permitting the filtrate from the acid slurry to cool and then filtering that filtrate.

8. The process of purifying graphite comprising, first, preparing a slurry of impure graphite and sulphuric acid of about 70% concentration in a ratio approximating 3.5 to 4 tons of 70% acid per ton of impure graphite, the acid including filtrate and the first wash from a previous cycle of the process; second, holding said slurry at about 150° C. for more than 30 minutes; third, filtering said slurry and obtaining a graphite cake; fourth, washing said cake through a series of counter-current washes; fifth, washing said cake with clean water until the addition of an excess of NaOH to a filtrate sample does not produce a red precipitate; sixth, preparing a second slurry of previously acid treated graphite and a weak solution of sodium hydroxide; seventh, boiling said second slurry for at least 10 minutes; eighth, filtering said solution and obtaining a graphite cake; ninth, washing said cake with clean water; tenth, obtaining sodium silicate out of the filtrate from the caustic slurry by evaporating away the liquid from such filtrate; and finally, obtaining salts from the acid by permitting the acid filtrate to cool and then filtering the acid filtrate.

References Cited in the file of this patent

UNITED STATES PATENTS

| 581,391 | Cabot | Apr. 27, 1897 |
|---|---|---|
| 1,145,024 | Laine | July 6, 1915 |
| 1,188,936 | Hershman | June 27, 1916 |
| 1,416,955 | Herting | May 23, 1922 |
| 2,095,800 | Elsey | Oct. 12, 1937 |
| 2,342,585 | Johnson et al. | Feb. 22, 1944 |

FOREIGN PATENTS

| 17,731 of 1913 | Great Britain | June 10, 1915 |
|---|---|---|
| 328,697 | Great Britain | May 8, 1930 |